United States Patent

Whitney

[15] 3,645,607
[45] Feb. 29, 1972

[54] SPLIT IMAGE REAR-VIEWING SYSTEM

[72] Inventor: Donald R. Whitney, Birmingham, Mich.
[73] Assignee: General Motors Corporation
[22] Filed: Apr. 27, 1970
[21] Appl. No.: 32,071

[52] U.S. Cl. ................................................350/301
[51] Int. Cl. .................................................G02b 5/08
[58] Field of Search ......................350/288, 301, 302, 307

[56] References Cited

UNITED STATES PATENTS

| | | | |
|---|---|---|---|
| 2,252,161 | 8/1941 | Borba | 350/302 |
| 2,197,280 | 4/1940 | Topping | 350/302 |
| 3,498,697 | 3/1970 | Matteo | 350/302 |

Primary Examiner—David Schonberg
Assistant Examiner—Michael J. Tokar
Attorney—Peter D. Sachtjen

[57] ABSTRACT

A split image rear-viewing system for a motor vehicle includes a primary mirror mounted adjacent the vehicle roof which provides a lower sight path looking directly through the vehicle windows and an upper sight path looking over the roof through a rearwardly facing periscope. The individual sight paths are optically separated by a narrow occulted strip but blend into a single observed image rearwardly of the vehicle due to the pupillary diameter of the observer's eyes.

4 Claims, 6 Drawing Figures

INVENTOR.
Donald R. Whitney
BY Peter D. Sueltjen
ATTORNEY

INVENTOR.
Donald R. Whitney
BY
Peter D. Sachtjen
ATTORNEY

SPLIT IMAGE REAR-VIEWING SYSTEM

This invention relates to rear-viewing systems for motor vehicles and, in particular, to a rear-viewing system incorporating plural sight paths which combine to produce a single observed viewing field.

In the past, many rear viewing systems incorporating multiple optical elements have been proposed for use on motor vehicles. These systems are generally categorized as virtual image viewing systems and are used to provide a circuitous optical path which enables the terminal mirror to be placed at nonconventional vantage points, usually exterior of the vehicle. As opposed to real image viewing systems, such as television, view finders, and the like, these virtual image rear viewing systems do not require refocusing of the observer's eyes and are thereby more compatible with conventional viewing arrangements.

The most prevalent proposals for virtual image systems incorporate periscopic units. These units generally place at least one mirror above the vehicle for establishing a rearward sight path over the vehicle roof and at least two additional mirrors to redirect the images from the former to a convenient viewing location in the passenger compartment. However, certain problems are encountered in systems of this type, the foremost being that of locating the mirrors so as to avoid optical interference with one another. This interference is usually remedied by decreasing the size of the mirror or increasing the spacing therebetween. The effect of either solution is to reduce the rearward field of view.

The periscope type system is additionally restricted due to the limited permissible vantage area for the observer. This restriction is due to the fact that the mirrors constitute the optical equivalent of a constantly expanding viewing tunnel in which the mirrors are approximated by spaced windows. As long as the viewer's eyes are in the aforementioned vantage area, the individual windows are correctly aligned, and the driver can observe a maximum field of view. However, when his eyes are moved in one direction or the other, the windows become misaligned with a consequent reduction in the field of view. In other words, as the viewer moves his head in one direction, he increases his field of view in the opposite direction, but loses it more rapidly in the first direction. Therefore, after extreme head movement, the misalignment is so extensive that the rearward view is lost altogether.

While these problems can be somewhat alleviated by increasing the sizes of the mirrors and, in particular, the size of the primary mirror facing the driver, the aforementioned problem of mirror interference is greatly magnified and the viewing system becomes unbearably cumbersome and unacceptable for use in a motor vehicle. Thus, the need to balance the mirror size and the mirror spacing limits the flexibility and effectiveness of conventional periscope systems.

Certain additional viewing problems are encountered in periscopic arrangements wherein the terminal mirror provides a rearward view over the roof. Inasmuch as no part of the vehicle is normally contained in the observed vision field, the driver, in seeking to ascertain rearward driving conditions, may not be able to correlate head and eye movements to achieve a desired change in the viewing fields. Additionally, because the vehicle roof line establishes the lower limit of the sight path, objects near the rear of the vehicle are hidden from view. While this missing viewing field may be picked up by additional mirrors, the periscopic unit is thus relegated to the status of a supplementary viewing system.

The present invention, on the other hand, overcomes the aforementioned problems by providing a rear viewing system wherein multiple mirrors are compactly arranged in the upper portion of the vehicle to provide a greatly improved viewing field laterally and rearwardly of the vehicle. More specifically, the subject system consists of a primary mirror and a rearwardly facing periscope. The primary mirror is mounted adjacent the top of the windshield at a vertical location which minimizes the obstruction to forward vision caused by conventionally mounted rear view mirrors. The periscope includes a terminal mirror located above the roof and an intermediate mirror vertically adjacent the upper portion of the primary mirror. By this arrangement, the image, as seen by the observer viewing the primary mirror, is formed from two sight paths. First, a lower sight path for the lower part of the image is provided in a conventional manner by directly viewing through the rear and side windows of the vehicle. Second, an upper sight path for the upper part of the image is provided above the vehicle roof as redirected by the periscope. Although the height of the periscope creates a blind or occulted strip between the upper and the lower sight paths, a single image is perceived by the observer due to the pupillary diameter of the observer's eyes. Because only a portion of the total view is provided by the periscope, the primary mirror can be sized, without regard to the problem of optical interference, to produce the desired resultant field of vision. At the same time, this feature essentially avoids the aforementioned "tunnel effect" or decrease in field of view due to head movement. Thus, for a higher viewing position, a greater portion of the vision field will be through the upper sight path whereas in a low viewing position, the view through the lower sight path would predominate.

Accordingly, an object of the present invention is to provide an improved rear-viewing system for a motor vehicle which provides combined viewing above and below the vehicle roof.

Another object of the present invention is to provide a vehicle rear-viewing system wherein a periscopic mirror unit partially optically interferes with the primary element so as to provide dual sight paths which blend into a single observed image rearwardly of the vehicle.

A further object of the present invention is to provide a split image rear viewing system for a motor vehicle wherein a primary mirror adjacent the vehicle roof provides a lower sight path looking directly through the vehicle windows and an upper sight path looking over the roof as redirected by a rearwardly facing periscope.

Still another object of the present invention is to provide a split image rear-viewing system wherein a primary mirror mounted adjacent the vehicle roof provides an upper sight path looking over the latter as intercepted by a rearwardly facing periscope and a lower sight path looking directly through the vehicle windows, the images of the individual sight paths blending into a single observed image rearwardly of the vehicle due to the pupillary diameter of the observer's eyes.

These and other objects will be apparent to one skilled in the art upon reading the following detailed description, reference being made to the accompanying drawings in which.

Figure 1:
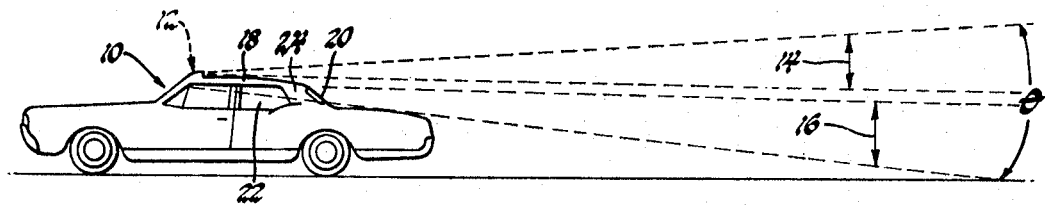
FIG. 1 is a side elevational view of a motor vehicle incorporating a split image rear-viewing system made in accordance with the present invention.
Figure 2:
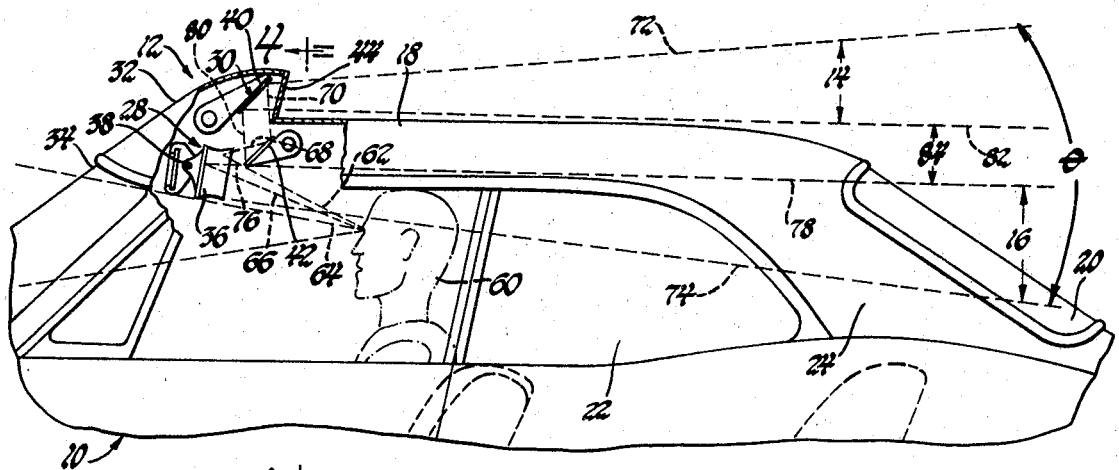
FIG. 2 is an enlarged, partially sectioned view of the rear-viewing system shown in FIG. 1.
Figure 3:
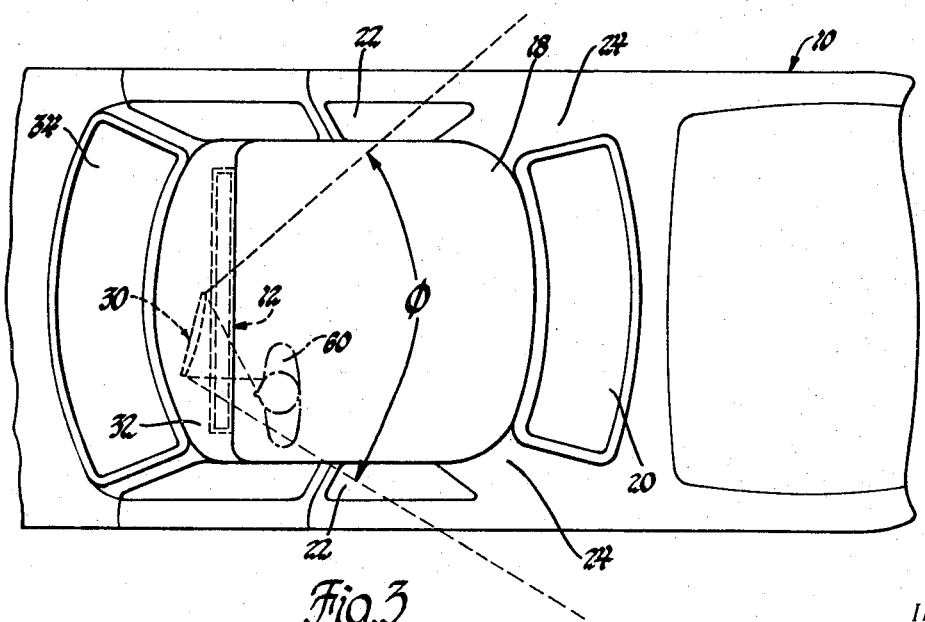
FIG. 3 is an enlarged plan view of the rear-viewing system shown in FIG. 1.

Referring to the drawings, a motor vehicle 10 includes a split image rear-viewing system 12 providing a rearward viewing field comprised of an upper sight path 14 and a lower sight path 16. The upper sight path 14 provides a rearward view above the roof 18 of the motor vehicle 10. The lower sight path 16 provides a rearward view through the rear window 20 and the side windows 22. Depending on the type of vehicle in which the subject invention is employed, a portion of the lower sight path 16 may be partially blocked by the vehicle sail panels 24. As shown in FIGS. 1 and 2, the upper sight path 14 and the lower sight path 16 provide a combined vertical field of view having an included angle $\theta$. As shown in FIG. 3, the upper sight path 14 and the lower sight path 16 provide a horizontal field of view having an included angle $\phi$.

The split image rear viewing system 12 generally comprises a viewing or primary mirror 28 and a rearwardly facing periscope 30, both of which are located in a shroud 32 extending transversely across the roof 18 adjacent the windshield 34.

The primary mirror 28 has a reflecting surface 36 which may be convex, as illustrated, cylindrical, or flat. The primary mirror 28 is adjustably mounted toward the driver's side of the passenger compartment by a mirror support assembly 38 that is suitably constructed to allow lateral movement of the entire primary mirror 28 and rotation of the reflecting surface 36 about a horizontal axis. The lateral movement of the primary mirror 28 accommodates different driver positions in both fore and aft as well as transverse directions. Additionally, inasmuch as the driver's head can generally be seen as a portion of the image in the primary mirror 28 and as such partially blocks the rearward view of the lower sight path, the reflecting surface 36 should be positioned to minimize this effect. As shown in FIG. 3, this result is most easily achieved by transversely inclining the mirror 28 so that the driver's head appears in the same viewing sector "B" as the panel 24. The tilting capability enables the observer to vary the relative proportions of the individual sight path 14 and 16.

Figure 4:
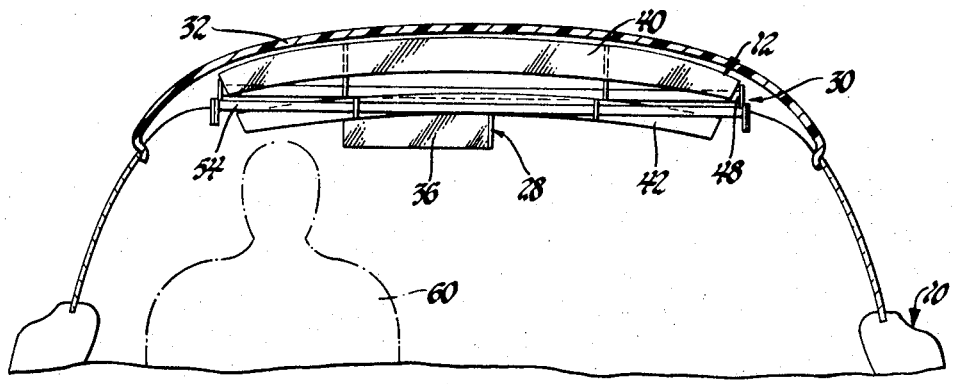
FIG. 4 is a view taken along line 4—4 of FIG. 2.
Figure 5:
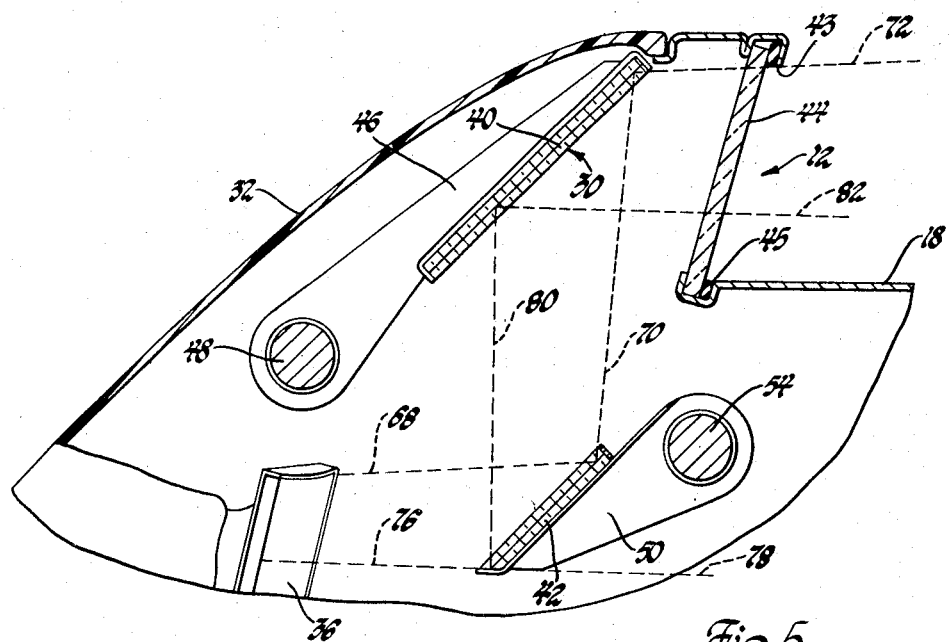
FIG. 5 is an enlarged view of the periscope.

The periscope 30 is substantially coextensive with the shroud 32 and generally includes a terminal or vantage mirror 40 and an intermediate or intercepting mirror 42. The mirrors 40, 42 having opposed parallel reflecting surfaces. The terminal mirror 40 is mounted at the top of the shroud 32 with its elongated planar reflecting surface looking rearwardly through a transverse opening 43 formed between the upper rear edge of the shroud 32 and the lower forward edge of the roof 18. A cover glass 44 and a peripheral gasket 45 provide a sealed transparent window at the transverse opening 43. A bracket 46 is fixedly connected at an upper end to the terminal mirror 40. The lower end of the bracket 46 is fixedly connected to a transverse shaft 48 extending across the front of the shroud 32. The intermediate mirror 42 similarly has an elongated planar reflecting surface and is fixedly connected to the lower end of a support bracket 50. The upper end of the support bracket 50 is fixedly connected to a shaft 54 extending across a top of the vehicle adjacent the roof 18. As shown in FIG. 4, the lower edges of mirrors 40 and 42 have a curvature in a transverse plane which is substantially the same as the curvature of the roof.

The periscope 30 is vertically mounted with respect to the primary mirror 28 so as to intercept the upper portion of the field of vision provided by the latter. Thus, as shown in FIG. 2, an observer 60, facing the primary mirror 28, has an upper sight line 62, a lower sight line 64, and a median sight line 66. The upper sight line 62 is successively redirected according to conventional optics along intermediate sight lines 68 and 70 and establishes an upper image sight line 72 representing the upper vertical limit of the upper sight path 14. In a similar manner, the lower sight line 64 is reflected rearwardly along a lower image sight line 74 which corresponds to the lower vertical limit of the lower sight path 16. The median sight line 66 is redirected along line 76 which transversely intersects the lower edge of the mirror element 42. Thus, the field of vision below this dividing line, as redirected along sight line 78, represents the upper vertical limit of the lower sight path 16 while the field of vision above this line, as redirected along sight line 80, establishes the lower vertical sight line 82 of the upper sight path 14. The sight lines 78 and 82 are thus separated by blind zone or occulted strip 84.

The vertical distance between the periscope mirrors 40 and 42 is selected to accommodate limited vertical movement of the driver's eyes before either the top of the roof becomes visible in the upper sight path 14 or the underside of the roof becomes visible in the lower sight path 16. The overall system is adjusted for individual viewing preferences by tilting the reflecting surface 36 about the horizontal axis of the support assembly 38 until the driver can see neither the top nor the bottom of the roof. More specifically, the individual mirrors are positioned such that the median sight line 78 is slightly below the upper edge of the rear window 20 and the median sight line 82 of the upper sight path 14 is slightly above the top of the roof 18.

In this manner, the effect of the occulted strip 84 is minimized. The parallelism of the mirrors 40 and 42 is of particular significance inasmuch as any angularity therebetween will produce a convergence or divergence of the sight paths 14 and 16. A convergence of the sight paths 14 and 16 is undesirable in that the observer 60 will see overlapping and partially indistinguishable images. A divergence of the sight paths 14 and 16 will produce a progressively increasing occulted strip 84 thereby creating an ever-increasing blind zone rearwardly of the vehicle, an equally undesirable result.

Figure 6:
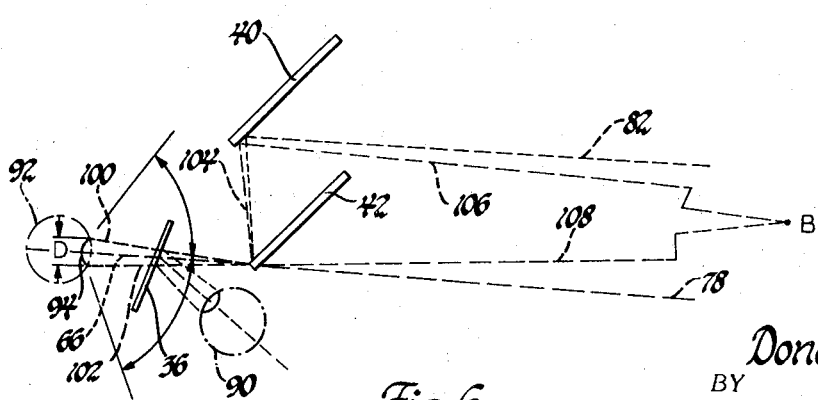
FIG. 6 is a schematic view illustrating the effect of pupillary diameter on the observed image.

As viewed by the observer 60, the field of vision presented on the reflecting surface 36 appears as a single image at a given distance rearwardly of the vehicle due to the finite size of the driver's pupil. This effect is schematically shown in FIG. 6 wherein the true position for the driver's eye is indicated at 90 and the apparent eye position is indicated at 92. The pupil 94 has a diameter "D" which, for the majority of drivers, ranges between 2 millimeters and 8 millimeters. In viewing along the median sight line 66, the aforementioned sight lines 78 and 82 are nonconverging due to the parallelism of the mirrors 40 and 42. However, the observer's eye actually comprises an upper sight line 100 and a lower sight line 102. As illustrated, the upper sight line 100 follows an optical path represented by sight lines 104 and 106, the latter of which is downwardly inclined with respect to the median sight line 82. The lower sight line 102 follows the optical path indicated by the line 108 which is inclined upwardly from the median sight line 78. Thus, at a given distance rearwardly of the vehicle, the actual or observed sight paths converge at convergence position "B." It is at this location that the occulted zone 84 disappears and the individual images seen by the observer through the upper and lower sight paths 14 and 16 appear as a single image.

Split image viewing systems having the above-enumerated features and advantages have been successfully built and tested and been found to have a vertical field of view having an included angle $\theta$ of 11°, or 3° above horizontal to 8° below horizontal; a horizontal field of view having an included angle $\phi$ of 71.0°, or 30.5° left and 40.5° right; and an image convergence position "B" rearwardly of the vehicle when the various parts thereof are dimensional and located relative to each other as set forth below:

| | |
|---|---|
| Length of sight line 66 (Distance from observer 60 to primary mirror 28) | 16.25 inches |
| Size of the primary mirror 28 | 4 inches × 15¼ inches |
| Radius of the primary mirror 28 | 100 inches |
| Average distance between the primary mirror 28 and the periscope 30 | 3 inches |
| Spacing between the mirrors 40 and 42 | 4.38 inches |
| Size of mirror 40 | 40 inches × 4 inches (lower element) |
| Size of mirror 42 | 44 inches × 3 inches (upper element) |
| Vertical interference between mirror 28 and mirror 42 | 1.25 inches |

Although only one form of this invention has been shown and described, other forms will be readily apparent to those skilled in the art. Therefore, it is not intended to limit the scope of this invention by the embodiment selected for the purpose of this disclosure, but only by the claims which follow.

What is claimed is:

1. In a motor vehicle having a rear window and a windshield interconnected by a roof portion, a rear view mirror system comprising: a primary reflecting surface located within the vehicle below said roof portion and adjacent said windshield, said primary reflecting surface providing a view through the rear window of one part of an object located to the rear of the vehicle; and means including at least one pair of supplemental reflecting surfaces carried by the vehicle and positioned optically with respect to the primary reflecting surface for providing a view over the roof portion of a second part of said object, said means locating said second part adjacent said one part on said primary reflecting surface thereby combining the several parts and presenting a unitary rearward field of view.

2. A split image rear-viewing system for concurrently viewing over the roof and through the side and back windows of a motor vehicle comprising: a housing formed transversely across the vehicle adjacent the windshield thereof and having a rearwardly facing opening therein extending above the plane of the roof; a periscope mounted interior of the vehicle, said periscope including a pair of continuous elongated planar mirrors fixedly mounted in parallel vertically spaced relationship and extending transversely to the longitudinal axis of the motor vehicle, one of said mirrors having a reflecting surface facing said opening for rearward viewing therethrough, the other of said mirrors having a reflecting surface disposed below and facing the reflecting surface of said one of said mirrors so as to receive the images therefrom; and a third elongated mirror adjustably mounted interior of the vehicle adjacent the windshield and positioned such that the lower edge of said other of said mirrors intersects the latter's field of view as perceived by an observer in the vehicle so as to receive images therefrom on an upper portion and establish an upper sight path looking through the periscope and over the vehicle roof and to receive images through said side and back windows to establish a lower sight path directly looking through said side and back windows, the individual sight paths being optically separated by an occulted strip of uniform width established by the vertical distance and the parallelism between said pair of mirrors of said periscope, said width of said occulted strip apparently progressively diminishing and disappearing at a convergence location rearwardly of the vehicle due to the pupillary diameter of the observer's eyes whereby a single image is perceived by said observer in viewing through the dual sight paths of said system.

3. A rear view mirror system for a vehicle having a rear window and a windshield interconnected by a roof comprising: a primary mirror including a reflecting surface adjustably supported within the vehicle below said roof and adjacent said windshield and having a lower portion for providing a view through the rear window of the lower part of an object located to the rear of the vehicle; a secondary mirror including a reflecting surface carried by the vehicle above said roof for providing a view of the upper part of said object; and means positioned between the reflecting surfaces of said primary and said secondary mirrors for receiving the view from said secondary mirror and directing it onto the upper part of said primary mirror so as to combine the images and provide a unitary view of said object.

4. In combination with a motor vehicle having a windshield, a roof, and a rear window, a rear-viewing system comprising: a periscope assembly having parallel upper and lower mirror elements supported by the vehicle in a rearwardly inclined position adjacent the windshield, said upper mirror element being positioned above the roof for providing a first rearward viewing field over the latter and directing the images therefrom onto said lower mirror element; and a primary mirror mounted forwardly of the periscope assembly, said primary mirror being positioned with respect to said periscope and said rear window for receiving images of said first rearward viewing field from said lower mirror element on an upper portion thereof, the lower portion of said primary mirror receiving images as viewed through said rear window whereby said primary mirror establishes a unitary second rearward viewing field comprised of separate upper and lower sight paths wherein said upper sight path provides said first rearward viewing field as optically routed by said periscope assembly and said lower sight path provides a direct view through the rear window.

* * * * *